United States Patent Office 2,824,882
Patented Feb. 25, 1958

2,824,882

16-CYANO-7-OXOPREGNENOLONE AND DERIVATIVES

Charles W. Marshall, Skokie, and Robert H. Mazur, Evanston, Ill., assignors to G. D. Searle & Co., Chicago, Ill., a corporation of Illinois No Drawing. Application August 22, 1955
Serial No. 529,907

3 Claims. (Cl. 260—397.4)

This invention relates to 16-cyano-7-oxopregnenolone and derivatives, and processes for the manufacture thereof. More particularly, this invention relates to compounds of the formula wherein Z is selected from the group consisting of $$-\underset{\underset{OH}{|}}{C}HCH_2-$$

hydroxyethylene $$-\underset{\underset{O-C\text{-lower alkyl}}{|}}{C}HCH_2-$$
$$\phantom{-CHCH_2-O-}\overset{\|}{O}$$

lower alkanoyloxyethylene $$-CH=CH-$$

vinylene and $$-\underset{\underset{OH}{|}}{C}=CH-$$

hydroxyvinylene radicals.

When Z in the generic formula above is hydroxyethylene, the compound represented is 16α-cyano-3β-hydroxypregn-5-ene-7,20-dione or, more informally, 16α-cyano-7-oxopregnenolone. When Z in the formula is lower alkanoyloxyethylene, the designated compound is an ester of the aforesaid pregnenolone. When Z is the formula is a vinylene radical, the compound specified is 16α-cyanopregna-3,5-diene-7,20-dione. Finally, when Z is hydroxyvinylene, the compound in question is 16α-cyano-3-hydroxypregna-3,5-diene-7,20-dione.

It will be recognized that the last named compound—above—can and doubtless does exist in several tautomeric forms. For example, it is well known in chemistry that substances distinguished by the presence of a hydroxyl radical attached to an ethylenic carbon atom as at $C_3$ in the instant structure are constitutionally disposed to participation in equilibrium mixtures with corresponding keto isomers, according to the relationship $$-\underset{\underset{OH}{|}}{C}=CH-\ \rightleftarrows\ -\underset{\underset{O}{\|}}{C}-CH_2-$$

In the light of this prior art knowledge, it becomes evident that 16α-cyano-3-hydroxypregna-3,5-diene-7,20-dione occurs not only in the enolic configuration described, but is also found as the trione.

Still further pertinent to the question of scope in the present disclosure is the prior art teaching that keto groups generally, regardless of position in a given molecule, tend to undergo at least transient enolization (that is to say, addition of a hydrogen ion and, in effect, shifting of the ketonic double bond). It follows that enolization of the subject steroids is presumably not reserved exclusively to the 3-position illustrated, but also involves—at least in some degree—the carbonyl at $C_7$ (for example), with or without shifting of the $C_5$ double bond. By this means, such structures as or and

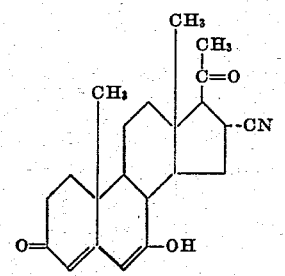

are evolved. Of these, the 3-oxo-7-enol shares the disposition characteristic of and described for its 7,3-isomer to participate in equilibria of the type

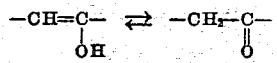

thereby giving rise to the molecular arrangement

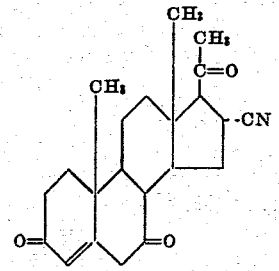

These latter tautomeric forms are thus seen to be, like the 5-ene-3,7,20-trione discussed earlier, inherently contemplated in the 3-enolic and/or 7-oxo representation of the compounds of this invention hereinelsewhere set forth; and in this respect, the assignment of particular structures and singular names to the substances of the present discovery is to be looked to, not for what is excluded, but rather for that which is implied thereby. Ultraviolet, infrared, and rotational data clearly demonstrate that the claimed form of the subject compounds is the predominating structure; but any and all of the possible tautomeric modifications thereof must, in the nature of such modifications, be considered equivalent for purposes of the present invention.

The compounds to which this invention relates are valuable because of their pharmacological properties. Especially, the subject compounds are useful by virtue of their selective anti-cortisone activity. Administered conjointly with cortisone, they inhibit the sodium-excreting effects of this medicament and correspondingly enhance its mineralocorticoid function.

The compounds of the present discovery are relatively insoluble in water, but may be dissolved in ethyl alcohol, isopropyl alcohol, acetone, benzene, chloroform, and other common organic solvents. The subject compounds may be administered in solid form as tablets or capsules; dissolved or suspended in aqueous media, they may be given parenterally.

The claimed compounds are prepared in accordance with the following procedure: 3β-acetoxypregna-5,16-dien-20-one is converted to the 16-cyano derivative by interaction at elevated temperatures in a solvent medium with hydrogen cyanide or a salt thereof—for example, potassium cyanide. Treatment with pyridine and acetic anhydride insures that the resultant cyano compound is wholly acetoxylated at $C_3$. This material is subjected to chromate oxidation—preferably in glacial acetic acid medium—to give 3β-acetoxy-16α-cyanopregn-5-ene-7,20-dione, one of the compounds of the present invention. De-acetoxylation with, for example, p-toluenesulfonic acid, yields the claimed 16α-cyanopregna-3,5-diene-7,20-dione of this invention, while—alternatively—careful saponification affords the 3 - hydroxy - 5 - ene - 7,20-dione herein contemplated. The latter compound may be variously esterified, using conventional techniques, to produce the claimed 3-alkanoates; or it may be oxidized by a kind of short-term Oppenauer procedure to give 16α-cyano-2-hydroxy-pregna-3,5-diene-17,20-dione of the invention. In a preferred embodiment of the recommended Oppenauer modification, the oxidation is carried out using an aluminum alkoxide in toluene and cyclohexanone at temperatures of the order of 140–160° centigrade for periods of time ranging from 15 minutes to not longer than 1½ hours; and the reaction product is straight-way extracted into a water-immisicible solvent, for example dichloromethane, which, in turn, is rapidly freed of aluminum salts by washing with, for example, dilute aqueous muriatic acid, thus insuring that the product is protected from the deterioration which proceeds on appreciable contact with ketonic substances, particularly in the presence of such as the aforesaid aluminum salts.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.) and relative amounts of materials in parts by weight, except as otherwise noted. Specific rotations refer to the D line of sodium.

*Example 1*

*16α-cyano-3β-hydroxypregn-5-en-20-one.*—A suspension of 20 parts of 3β-acetoxypregna-5,16-dien-20-one and 20 parts of potassium cyanide in a mixture of 315 parts of methyl alcohol, 36 parts of ethyl acetate, and 40 parts of water, is heated at reflux temperatures for 2 hours. A clear solution results. Introduction of 500 parts of water, and cooling, causes precipitation of 16α-cyano-3β-hydroxypregn-5-en-20-one, which is separated by filtration. The product is crystallized by dissolution in a mixture consisting of three volumes of methyl alcohol and 40 volumes of benzene, followed by concentration of the resultant solution to approximately 25 volumes. The cyano steroid comes down as clustered needles, M. P. 225–228° C., specific rotation +23° in methyl alcohol at room temperatures. It has the formula

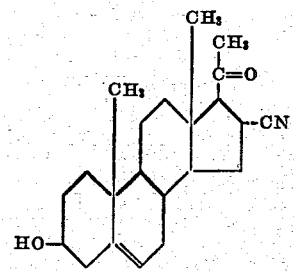

*Example 2*

*3β-acetoxy-16α-cyanopregn-5-en-20-one.*—A solution of 12 parts of 16α-cyano-3β-hydroxypregn-5-ene-20-one in 180 parts of pyridine and 120 parts of acetic anhydride is allowed to stand at room temperatures overnight, following which excess anhydride is decomposed by addition of water with cooling and stirring. The reaction mixture is then extracted with chloroform, and the chloroform solution thus obtained washed with dilute muriatic acid and water, respectively. After drying over sodium sulfate, the solution is distilled to remove chloroform. The crystalline residue which remains is 3β-acetoxy-16α-cyano-pregn-5-ene-20-one, M. P. 189–192° C.

*Example 3*

*3β-acetoxy-16α-cyanopregn-5-ene-7,20-dione.*—To an oxidizing mixture prepared by adding 11 parts of chromium trioxide and 30 parts of anhydrous potassium carbonate to 150 parts of acetic acid and 90 parts of acetic anhydride is added a solution of 24 parts of the product of the preceding Example 2 in 240 parts of a 1:1 mixture of acetic acid and acetic anhydride. The reactants are allowed to stand for 48 hours at room temperature with agitation, following which they are cooled in an ice bath while excess anhydride is decomposed by addition of water. The reaction mixture is then extracted with chloroform and the chloroform solution so obtained washed 3 times with water. Dried over anhydrous sodium sulfate, the solution is freed of solvent by distillation; and the residue is chromatographed on 20 parts by weight of silica gel, using 10% ethyl acetate in benzene as developing solvent. There is thus obtained purified 3β-acetoxy-16α-cyanopregn-5-ene-7,20-dione which, crystallized from a mixture of benzene and cyclohexane, shows M. P. approximately 206.4–207.4° C. The product displays a specific rotation of −70° in methyl alcohol solution at room temperatures. It has the formula

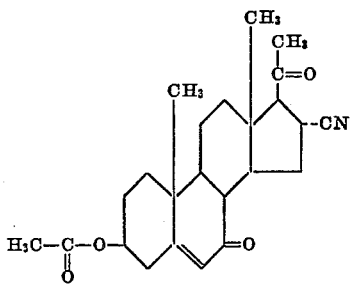

Example 4

16α-cyanopregna-3,5-diene-7,20-dione.—A solution of 2 parts of 3β-acetoxy-16α-cyanopregn-5-ene-7,20-dione and 2 parts of p-toluenesulfonic acid monohydrate in 100 parts of glacial acetic acid containing 3 parts of acetic anhydride is heated at reflux temperatures for 1½ hours. Excess anhydride is then destroyed by addition of water to the ice-cold solution, following which the reactants are extracted with chloroform. The chloroform extract is washed with water and saturated aqueous sodium bicarbonate, respectively, and dried over anhydrous sodium sulfate, in that order. Chloroform is removed by distillation, and the residue thereupon chromatographed on 20 parts of silica gel, using 5% ethyl acetate in benzene as developing solvent. The purified 16α-cyanopregna-3,5-diene-7,20-dione thus obtained crystallizes from benzene in dumbbell shaped clusters of needles, M. P. approximately 237.2–238° C., specific rotation −321° in methyl alcohol at room temperatures. The product has the formula

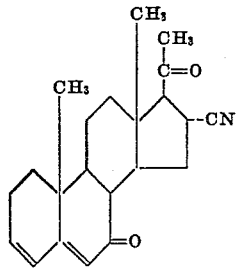

Example 5

16α-cyano-3β-hydroxypregn-5-ene-7,20-dione. — To a solution of 6 parts of 3β-acetoxy-16α-cyanopregn-5-ene-7,20-dione in 206 parts of purified dioxan is added, with agitation, 5 parts of potassium hydroxide dissolved in 140 parts of water. The reaction mixture, cloudy at first, becomes clear as the water content exceeds approximately 30%. The reactants are maintained for 90 minutes at room temperatures in an inert atmosphere, following which they are combined with 4000 parts of water containing 5 parts of muriatic acid and 100 parts of sodium chloride. The precipitate which forms is extracted into 2 500-part quantities of ethyl acetate. The extracts are combined, washed 3 times with 5% aqueous sodium chloride and finally with saturated aqueous sodium chloride, dried over anhydrous sodium sulfate, and filtered, in that order. The filtrate is distilled in vacuo to approximately 1/10 the original volume, following which a first crop of the desired 16α-cyano-3β-hydroxypregn-5-ene-7,20-dione precipitates on standing. Further concentration of the mother liquors affords additional product. Upon recrystallization from ethyl acetate, the pure product is obtained in the form of slender prisms, M. P. 209–210° C. The material shows a specific rotation of −95° in chloroform solution at room temperatures, and is characterized by an ultraviolet peak at 237.5 millimicrons, with a molecular extinction coefficient of 13,500. The infrared spectrum reveals characteristic bands at 2.88, 5.88, 6.05, and 6.17 microns. The product has the formula

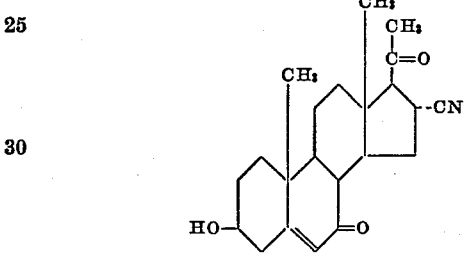

Example 6

16α-cyano-3-hydroxypregna - 3,5 - diene-7,20-dione.— A solution of 16 parts of 16α-cyano-3β-hydroxypregn-5-ene-7,20-dione in 1300 parts of dry toluene is azeotropically distilled under a nitrogen atmosphere to 4/5 its original volume, thus removing any residual moisture present. To this solution at 160° C. is then added 150 parts of cyclohexanone, followed over a 5 minute period by 30 parts of aluminum isopropoxide dissolved in 130 parts of dry toluene. Heating at 160° is continued for an additional 25 minutes, anhydrous conditions being maintained by continuous slow distillation during this time whereby approximately 170 parts of toluene is removed. The reaction mixture is next cooled to approximately 5° C. and mixed well with 6700 parts of cold dichloromethane and 4000 parts of water in which is dissolved 150 parts of sulfuric acid and 200 parts of sodium chloride. The aqueous phase is separated, reextracted with 1350 parts of dichloromethane, and finally discarded. The organic solvent solutions are combined and washed with 2000 parts of water containing 75 parts of sulfuric acid and 100 parts of dissolved sodium chloride, following which they are thrice rapidly extracted with 1500-part portions of cold water, each such portion containing 30 parts of caustic soda dissolved therein. The alkaline extracts—immediately as individually obtained—are poured into an excess of cold 5% aqueous muriatic acid containing 3% sodium chloride. The material thus precipitated is extracted with 6700 parts and 2000 parts, respectively, of dichloromethane. These extracts are combined and washed 3 times with 5% aqueous sodium chloride. The washed solution is then dried over anhydrous sodium sulfate and filtered. The filtrate is evaporated to dryness in vacuo under an atmosphere of nitrogen, leaving as a residue a light yellow resin which crystallizes from acetone as small prisms, M. P. 175–177° C. The product thus obtained, 16α-cyano-3-hydroxy-pregna-3,5-diene-7,20-dione, is distinguished by an ultraviolet spectrum (0.0011% in methyl alcohol) wherein there is a major peak typical of Δ-hydroxy-α,γ-dienones at 321 millimicrons, with a molecular extinction coefficient of 21,700. The infrared spectrum manifests principal absorption bands at 3.16, 4.45, 5.88, 6.28, and 6.45 microns. The product is represented by the enolic formula

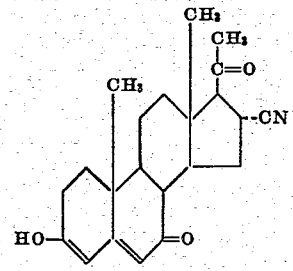

What is claimed is:
1. A compound of the formula

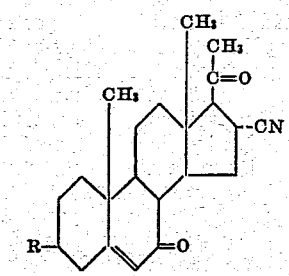

wherein R is selected from the group consisting of hydroxy and lower alkanoyloxy radicals.
2. 3β-acetoxy-16α-cyanopregn-5-ene-7,20-dione.
3. 16α-cyano-3β-hydroxypregn-5-ene-7,20-dione.

No references cited.

U. S. DEPARTMENT OF COMMERCE
PATENT OFFICE

CERTIFICATE OF CORRECTION

Patent No. 2,824,882 — February 25, 1958

Charles W. Marshall et al.

It is hereby certified that error appears in the printed specification of the above numbered patent requiring correction and that the said Letters Patent should read as corrected below.

Column 2, line 2, after the word "trione" strike out the period; column 4, line 4, for "cyano-2-hydroxy-pregna-3,5-diene-17,20-dione" read -- cyano-3-hydroxypregna-3,5-diene-7,20-dione --; line 8, for "centrigrade" read -- centigrade --; line 71, for "pregn-5-ene-20-one," read -- pregn-5-en-20-one, --; column 5, line 6, for "temperature read -- temperatures --.

Signed and sealed this 29th day of April 1958.

(SEAL)
Attest:
KARL H. AXLINE
Attesting Officer

ROBERT C. WATSON
Commissioner of Patents